United States Patent
Huang et al.

(10) Patent No.: US 9,896,618 B2
(45) Date of Patent: Feb. 20, 2018

(54) METHOD OF MAKING ROD-SHAPED PARTICLES FOR USE AS PROPPANT AND ANTI-FLOWBACK ADDITIVE

(71) Applicant: Schlumberger Technology Corporation, Sugar Land, TX (US)

(72) Inventors: Jiangshui Huang, Sugar Land, TX (US); Jose Alberto Ortega Andrade, Houston, TX (US); Bernhard Rudolf Lungwitz, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/946,085

(22) Filed: Nov. 19, 2015

(65) Prior Publication Data

US 2017/0145298 A1 May 25, 2017

(51) Int. Cl.
*C09K 8/80* (2006.01)
*C04B 35/111* (2006.01)
*C04B 35/622* (2006.01)
*C04B 35/624* (2006.01)

(52) U.S. Cl.
CPC .............. *C09K 8/80* (2013.01); *C04B 35/111* (2013.01); *C04B 35/622* (2013.01); *C04B 35/624* (2013.01); *C04B 2235/94* (2013.01)

(58) Field of Classification Search
None
See application file for complete search history.

(56) References Cited

U.S. PATENT DOCUMENTS

| | | | |
|---|---|---|---|
| 4,060,497 A | 11/1977 | Huschka et al. | |
| 4,179,408 A | 12/1979 | Sanchez et al. | |
| 5,500,162 A | 3/1996 | Theisen et al. | |
| 6,197,073 B1 | 3/2001 | Kadner et al. | |
| 7,849,923 B2 | 12/2010 | Burukhin et al. | |
| 7,931,966 B2 | 4/2011 | Burukhin et al. | |
| 8,529,237 B2 | 9/2013 | Ikeda et al. | |
| 8,562,900 B2 * | 10/2013 | Alary | C04B 35/111 264/638 |
| 8,657,002 B2 | 2/2014 | Willberg et al. | |
| 8,883,693 B2 * | 11/2014 | Eldred | C09K 8/80 507/211 |
| 2006/0016598 A1 | 1/2006 | Urbanek | |

(Continued)

FOREIGN PATENT DOCUMENTS

WO 2015077130 A1 5/2015

OTHER PUBLICATIONS

Liu et al., "A New Generation High-Drag Proppant: Prototype Development, Laboratory Testing, and Hydraulic Fracturing Modeling"; Society of Petroleum Engineers; SPE Hydraulic Fracturing Technology Conference, The Woodlands, Texas, USA, Feb. 3-5, 2015, [SPE-173338].

(Continued)

*Primary Examiner* — Jeffrey Washville
(74) *Attorney, Agent, or Firm* — Andrea E. Tran

(57) ABSTRACT

A method for forming rod-shaped particles includes inducing flow of a slurry of particles and a reactant through one or more orifices and into a coagulation solution, wherein the slurry exiting the one or more orifices is a continuous uninterrupted stream, coagulating the reactant in the coagulation solution to form stabilized rods, drying the stabilized rods and reducing a length of the dried stabilized rods.

17 Claims, 1 Drawing Sheet

(56) References Cited

U.S. PATENT DOCUMENTS

| | | |
|---|---|---|
| 2006/0162929 A1 | 7/2006 | Urbanek |
| 2008/0234146 A1 | 9/2008 | Barmatov et al. |
| 2010/0087342 A1 | 4/2010 | Alary et al. |
| 2011/0180259 A1 | 7/2011 | Willberg et al. |
| 2012/0227968 A1 | 9/2012 | Eldred et al. |
| 2012/0247764 A1 | 10/2012 | Panga et al. |

OTHER PUBLICATIONS

International Search Report and Written Opinion issued in International Patent Appl. No. PCT/US2016/062118 on Feb. 27, 2017; 10 pages.

Edelman et al., "Rod-shaped Proppant Provides Superior Proppant Flowback Control in the Egyptian Eastern Desert", SPE Middle East Unconventional Gas Conference and Exhibition, Jan. 28-30, 2013, 7 pages.

\* cited by examiner

METHOD OF MAKING ROD-SHAPED PARTICLES FOR USE AS PROPPANT AND ANTI-FLOWBACK ADDITIVE

BACKGROUND

Hydrocarbons (such as oil, condensate, and gas) may be produced from wells that are drilled into formations containing them. For a variety of reasons, such as low permeability of the reservoirs or damage to the formation caused by drilling and completion of the well, or other reasons resulting in low conductivity of the hydrocarbons to the well, the flow of hydrocarbons into the well may be undesirably low. In this case, the well is "stimulated," for example, using hydraulic fracturing, chemical (such as an acid) stimulation, or a combination of the two (often referred to as acid fracturing or fracture acidizing).

Hydraulic and acid fracturing treatments may include two stages. A first stage comprises pumping a viscous fluid, called a pad, that is typically free of proppants, into the formation at a rate and pressure high enough to break down the formation to create fracture(s) therein. In a subsequent second stage, a proppant-laden slurry is pumped into the formation in order to transport proppant into the fracture(s) created in the first stage. In "acid" fracturing, the second stage fluid may contain an acid or other chemical, such as a chelating agent, that can assist in dissolving part of the rock, causing irregular etching of the fracture face and removal of some of the mineral matter, which results in the fracture not completely closing when the pumping is stopped. Occasionally, hydraulic fracturing may be done without a highly viscosified fluid (such as water) to minimize the damage caused by polymers or the cost of other viscosifiers. After finishing pumping, the fracture closes onto the proppant, which keeps the fracture open for the formation fluid (e.g., hydrocarbons) to flow to the wellbore of the well.

Proppant is typically made of materials such as sand, glass beads, ceramic beads, or other materials. Sand is used frequently as the proppant for fracture treatments. However, for fractures with high closure stress, such as greater than 6,000 pound per square inch (psi), in deep wells or wells with high formation forces, higher strength proppant is desired. The closure stress that sand can sustain is normally about 6,000 psi, so a closure stress over 6,000 psi could crush the sand into fine particles and collapse the sand pack, which results in insufficient conductivity for the formation fluid to flow to the wellbore. Furthermore, the fine particles may continually flow back during production of the well, and thus the conductivity of the well would reduce further, which results in a short useful life of the well or results in a need for costly refracturing of the well.

Ceramic proppant has been used to maintain the conductivity of the wells with a high closure stress. Typically, the higher the alumina ($Al_2O_3$) content, the higher the hardness and toughness of the ceramic proppant, but also the higher the specific gravity. A high specific gravity may lead to quick gravitational settling of the proppant, which results in difficulty to transport the proppant into the fracture, especially for locations far from the wellbore. Also, quick settling in the fracture leads to lack of proppant on the top part of a fracture, which reduces the productivity of the well. To transport proppant of high specific gravity with fracturing fluid of a low viscosity, fiber can be added to the fluid as an additive. See, for example, U.S. Pat. No. 8,657,002, incorporated herein by reference in its entirety. To use fiber effectively for transporting proppant, the interaction force between fiber and proppant is important.

Other proppant shapes have been proposed for hydraulic fracturing applications such as plate-like proppant (U.S. Patent Application Publication No. 2011/0180259) and rod-shaped proppant (U.S. Pat. No. 8,562,900). The rod-shaped proppant described in U.S. Pat. No. 8,562,900 is made by extruding a mixture containing alumina-containing materials, a binding agent, a solvent, and other additives such as lubricants and plasticizers through a die. The mixture is not flowable and thus after extruding, the rod shape is maintained. After drying or after sintering, the extruded rod is cut into desired length suitable to use as proppant.

The so-called drip-casting manufacturing technique has been adapted for the manufacture of spherical ceramic proppants. Drip-casting substitutes conventional ways of pelletizing (also called granulating) ceramic proppant such as using high intensity mixers and pan granulators. Vibration-induced dripping (or drip-casting) was first developed to produce nuclear fuel pellets. See U.S. Pat. No. 4,060,497. It has subsequently evolved into applications for metal and ceramic microspheres for grinding media, pharmaceuticals and food industry. An application of vibration-induced dripping to aluminum oxide spheres is described in U.S. Pat. No. 5,500,162. The production of the microspheres is achieved through vibration-provoked dripping of a chemical solution through a nozzle. The falling drops are surrounded by a reaction gas, which causes the droplet to gel prior to entering the reaction liquid (to further gel). Using a similar approach, U.S. Pat. No. 6,197,073 covers the production of aluminum oxide beads by flowing a sol or suspension of aluminum oxide through a vibrating nozzle plate to form droplets that are pre-solidified with gaseous ammonia before their drop into ammonia solution.

U.S. Patent Application Publication No. 2006/0016598 describes the drip-casting to manufacture a high-strength, light-weight ceramic proppant. U.S. Pat. No. 8,883,693 describes the application of the drip-casting process to make ceramic proppant.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

What is still desired is a particle having a shape and morphology able to perform well as a proppant and/or as an anti-flowback additive for downhole application in a fracture formation.

Described herein is a method for forming rod-shaped particles, the method including inducing flow of a slurry comprised of particles and a reactant through orifice(s) and into a coagulation solution, wherein the slurry exiting the orifice(s) is a continuous uninterrupted stream, coagulating the reactant in the coagulation solution to form stabilized rods, drying the stabilized rods, and reducing a length of the dried stabilized rods.

Also described herein is a method for forming rod-shaped particles, the method including inducing flow of a slurry comprised of particles and a reactant through orifice(s) and into a coagulation solution, applying a vibration to the orifice(s) when an amount of slurry that has passed through the orifice(s) is such that the slurry having exited through the orifice(s) has a predetermined length for the rod-shaped particles, wherein the vibration is sufficient to separate the exited slurry from the slurry flow at the orifice(s), coagulating the reactant in the coagulation solution to form stabilized rods, and drying the stabilized rods to form the rod-shaped particles.

DETAILED DESCRIPTION

Figure 1:
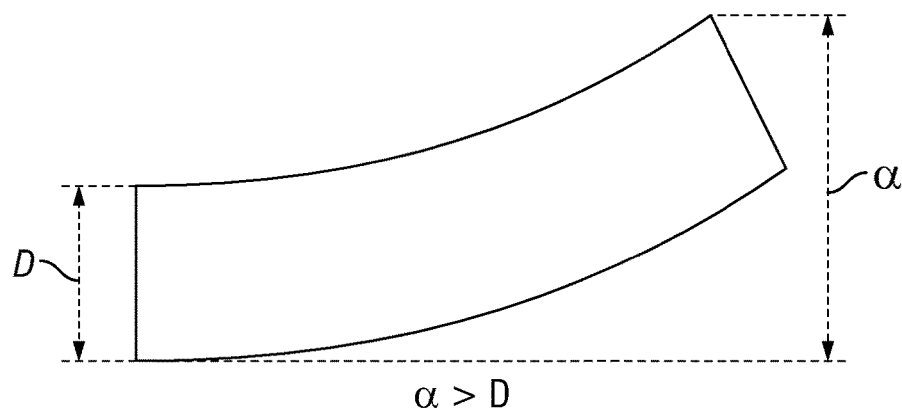
FIG. 1 illustrates a method of indicating a degree of curvature of the rod-shaped particles.

In the following description, numerous details are set forth to provide an understanding of the present disclosure. However, it may be understood by those skilled in the art that the methods of the present disclosure may be practiced without these details and that numerous variations or modifications from the described embodiments may be possible. At the outset, it should be noted that in the development of any such actual embodiment, numerous implementation—specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The present disclosure relates to methods of making rod-shaped particles, to the rod-shaped particles made by such methods, and to treatment fluids that contain the rod-shaped particles made by such methods, wherein the rod-shaped particles may function as, for example, proppants and/or anti-flowback additives.

While in embodiments the rod-shaped particles herein are used in the context of a treatment fluid, for example as a proppant material and/or anti-flowback additive, it is not intended that the rod-shaped particles as described herein be limited to being proppants and/or anti-flowback additives in such treatment fluids.

As used herein, the term "treatment fluid" refers to any pumpable and/or flowable fluid used in a subterranean operation in conjunction with a desired function and/or for a desired purpose. In some embodiments, the pumpable and/or flowable treatment fluid may have any suitable viscosity, such as a viscosity of from about 1 cP to about 10,000 cP, such as from about 10 cP to about 1000 cP, or from about 10 cP to about 100 cP, at the treating temperature, which may range from a surface temperature to a bottom-hole static (reservoir) temperature, such as from about 0° C. to about 150° C., or from about 10° C. to about 120° C., or from about 25° C. to about 100° C., and a shear rate (for the definition of shear rate reference is made to, for example, Introduction to Rheology, Barnes, H.; Hutton, J. F; Walters, K. Elsevier, 1989, the disclosure of which is herein incorporated by reference in its entirety) in a range of from about 1 $s^{-1}$ to about 1000 $s^{-1}$, such as a shear rate in a range of from about 100 $s^{-1}$ to about 1000 $s^{-1}$, or a shear rate in a range of from about 50 $s^{-1}$ to about 500 $s^{-1}$ as measured by common methods, such as those described in textbooks on rheology, including, for example, Rheology: Principles, Measurements and Applications, Macosko, C. W., VCH Publishers, Inc. 1994, the disclosure of which is herein incorporated by reference in its entirety.

As used herein, the term "rod-shaped particle" or "rod-shaped particles" refers to a particle(s) having a geometrically shaped cross-section and dimensions in which a length of the particle(s) is greater than a cross-sectional width of the particle(s). In embodiments, the cross-sectional geometric shape is substantially circular, and the rod-shaped particle has a length that is greater than the cross-sectional diameter of the particle. The length to width/diameter ratio may be at least 2:1. The rod-shaped particles are not limited to having a cross-sectional geometric shape of circular, and other cross-sectional shapes may be used, such as triangular or rectangular. Further, the rod-shaped particle may be substantially straight over the length of the particle, or the particle may have a degree of curvature over the length of the particle. Curvature here refers to the rod-shaped particle having some bend, such that a main axis along a mid-line of the rod-shaped particle is not straight. FIG. 1 illustrates a rod-shaped particle having curvature. As shown in FIG. 1, the curvature may be indicated by a being greater than D, wherein D is the width of the rod-shaped particle at one end, from a first edge point to a second edge point, and a is a total width at an opposite end of the particle as measured from a common edge with the one end to a furthest edge from the common edge at the opposite end.

In embodiments, the method of making the rod-shaped particles comprises inducing flow of a slurry comprised of particles and a reactant through one or more orifices and into a coagulation solution, wherein the slurry exiting the one or more orifices is a continuous uninterrupted stream, coagulating the reactant in the coagulation solution to form stabilized rods, drying the stabilized rods, and reducing a length of the dried stabilized rods.

In embodiments, the method further comprises forming the slurry of particles and reactant by mixing. As the particles, the particles may be made of any suitable material, such as, for example, ceramic materials, sand, non-ceramic materials, composites of ceramic reinforced with additional stronger materials and the like. As the ceramic particles of the slurry, any suitable ceramic material may be used, for example glass, and ceramic oxides such as alumina, bauxite, aluminum hydroxide, pseudo boehmite, kaolin, kaolinite, silica, silicates, clay, talc, magnesia and mullite. The ceramic particles may include alumina-containing particles or magnesium-containing particles. The ceramic particles may also be a composite particle that is comprised of ceramic reinforced with higher strength materials, which may be ceramic or non-ceramic, for example such as titanium carbide, carbon nanotubes or reinforcement elements such as fibers or polymers. Where the rod-shaped particles may be used as a proppant that may need to withstand a higher fracture closure stress, for example of 6,000 psi or more, alumina-containing particles are desired because rod-shaped particles derived from alumina-containing particles have a higher strength and toughness. Typically, the higher the alumina ($Al_2O_3$) content, the higher the strength, hardness and toughness of the rod-shaped particles. In embodiments, the ceramic particles may have an alumina content of from, for example, 5% to 95% by weight alumina, such as 20% to 75% by weight or 30% to 75% by weight.

While the particles may have any suitable size, an average size of less than 500 microns, such as an average size of 0.01 to 100 microns or 0.01 to 50 microns, may be desirable. The particles (i.e., the raw material for the rod-shaped particles) are desirably sized depending on the orifice diameter through which the slurry will pass in forming the rod-shaped particles, and the orifice diameter may be equal to or greater than, for example, ten times the raw material particle average diameter.

The reactant in the slurry may be any material that can be coagulated, gelled and/or cross-linked by another material that is present in the coagulation solution. Reactants are typically organic materials used to stabilize the shape of the slurry once it is formed into the desired rod shape. The reactants thus react to form a solid or semi-solid shaped product once exposed to the coagulation solution. Examples of suitable reactants include, for example, polyvinyl alcohol, polyvinyl acetate, methylcellulose, dextrin, polysaccharides such as alginates, for example sodium alginate, and molasses. Sodium alginate is a naturally occurring polysaccharide that is soluble in water as the sodium salt, and is a suitable reactant in the methods described herein. The reactant may be included in the slurry in an amount of from 0.01% to 25%, such as 0.01% to 5% or 0.01% to 1% by weight of the slurry. The solids content of the slurry may be from, for example, 10% to 95%, such as 15% to 90% or 20% to 90%. The solids content may be adjusted so that the slurry has a suitable viscosity for flow through the one or more orifices, such as a viscosity of 1 to 10,000 cP measured at a shear rate of 100 (1/s).

The slurry may also contain one or more solvents. Possible solvents that can be used include water, alcohols, and ketones. Other additives may also be included in the slurry, such as lubricants and dispersants. Lubricants may include one or more of Manhattan fish oil, wax emulsions, ammonium stearates, and wax. Dispersants may include one or more of a colloid, polyelectrolyte, tetra sodium pyrophosphate, tetra potassium pyrophosphate, polyphosphate, ammonium citrate, ferric ammonium citrate, hexametaphosphate, sodium silicate, ammonium polyacrylate, sodium polymethacrylate, sodium citrate, sodium polysulfonate or hexametaphosphate salt, as well as any surfactant.

The slurry is housed in a container that is associated with the one or more orifices. The slurry is induced to flow from the container to the one or more orifices by any suitable method. For example, the slurry may be induced to flow from the container by applying a load to a piston in the container housing the slurry to force the slurry out an exit port of the container that is associated with the one or more orifices. Also, increasing pressure in the container housing the slurry by any suitable method, and/or decreasing a volume of the container housing the slurry by any suitable method, to force the slurry to exit the container at a port associated with the one or more orifices may also be used. The slurry may also be pumped from the container housing the slurry to the one or more orifices associated with an exit of the container.

The exit port of the container may be connected to a pipe through which the slurry flows to the one or more orifices. Alternatively, the exit port may directly feed the slurry to the one or more orifices.

The one or more orifices may be comprised of a single orifice for making a single, continuous rod form or may be comprised of multiple orifices that each makes a single, continuous rod form. Each orifice may be in the form of, for example, a nozzle or an opening in a membrane. Alternatively, the one or more orifices may be in the form of a spinneret such as used in fiber spinning (see, for example, U.S. Pat. No. 8,529,237, incorporated herein by reference). Each orifice has a size that will substantially correspond to the cross-sectional size, such as cross-sectional diameter or width, of the end rod-shaped particles. For rods with a circular shape cross-section, for example, the diameter can be controlled by the size of the orifice, the jetting rate of the slurry, the moving speed of the nozzles, and the rheological properties of the slurry.

The one or more orifices can be used to impart a cross-sectional shape to the rod-shaped particles. For example, the one or more orifices may have a shape such as circle, ellipse, oval, quatrefoil, triangle, rectangle and the like. As the slurry is flowed through the orifice, the shape of the orifice will be imparted to the slurry such that the rods will have a corresponding cross-sectional shape. In this manner, the rod-shaped particles can be made to have a cross-sectional shape such as circle, ellipse, oval, quatrefoil, triangle, rectangle and the like.

In addition, a vibration may be applied to the orifices as the slurry flows through the orifices in order to impart an inhomogeneous cross-section along the length of the formed rods. For example, vibrating the orifices by a mechanical means during flowing of the slurry, where the vibration frequency is maintained to a low enough frequency to avoid completely severing the flow, that is, without breaking the continuous flow into separate segments, can alter the cross-section of the rods along the length of the rod. As an example, the vibration can be intermittently applied to thin or thicken (make smaller or bigger) the cross-sectional diameter at points along the length of the continuous rod. When the orifice moves in the same direction of the slurry flow, the cross-section will become thicker, and when the orifice moves in the opposite direction of the slurry flow, the cross-section will become thinner. A suitable range of frequencies for the vibration to thin or thicken the cross-section is, for example, 0.01-100 Hz, as long as the slurry flow is not severed. In addition to the frequency, the vibration amplitude, slurry composition, flow speed and orifice size may also be taken into consideration in determining the frequency of the vibration to be applied.

The orifices may be located above the coagulation solution, or may be immersed in the coagulation solution. The orifices may be fixed in a single position during flowing of the slurry therethrough, or, in embodiments, the orifices may be made to move in a vertical direction with respect to the surface of the coagulation solution. In this manner, the orifices may be made to move in and out of the coagulation solution during the flowing of the slurry therethrough. In still further embodiments, the orifices may be made to move in a horizontal manner, or laterally, with respect to a surface of the coagulation solution while the slurry is flowing therethrough. This may allow for the continuous uninterrupted rods to be organized, or aligned, within the coagulation solution. For example, if the orifices are moved in a circular pattern while the slurry is fed therethrough, the continuous rods may be stacked in a circular pattern within the coagulation solution. This may also be used to impart controlled curvature to the rod-shaped particles. As a further example, moving the orifices back and forth in a horizontal manner can stack the rods in such a way that the individual stacks of rods can be readily gathered for subsequent processing.

The coagulation solution comprises a coagulant that interacts with the reactant in the slurry to coagulate, gel and/or cross-link the reactant, thereby forming the slurry into a solid or semi-solid product. Thus, when the slurry comes into contact with the coagulation liquid, the coagulation liquid interacts with the reactant in the slurry to stabilize the shape imparted to the slurry by passing through the orifices. The slurry described herein is rather flowable, and the rod shape is stabilized by chemical reaction at least on the surface of the shaped slurry. Some examples of useful coagulation liquids, for example for use with sodium alginate as a reactant, include, but are not limited to, a calcium salt such as calcium chloride solution at suitable concentration of calcium chloride, or an aluminum chloride hexahydrate solution. The amount of coagulant to include in the solution should desirably be sufficient at a minimum to coagulate, gel and/or cross-link the reactant and at a maximum should desirably not exceed the concentration that will dissolve into the solution. For example, a suitable concentration of the coagulant in the coagulation solution may be, for example, 0.1% to 25%, such as 0.1% to 10% by weight of the coagulation solution.

The slurry may be flowed through the orifices at such a rate that the slurry is maintained in a continuous uninterrupted state as it exits the orifices. By continuous and uninterrupted herein is meant that the slurry does not break into separate segments upon exit from the orifices, but maintains a continuous length. If the orifices are located above the coagulation solution, the flowing rate of the slurry may be over a value for the jetting stream of slurry to not only maintain the continuous uninterrupted state but also to penetrate the solution surface and jet into the solution. The value depends not only on the viscosity and density of the slurry but also on the size of the orifice, the distance of the orifice to the coagulation solution, the capillary force and the density of the coagulation solution. A typical value of flowing speed in this arrangement of the orifices may be 1.5 m/s for an alumina slurry made up of 75% by weight of solids, a coagulating solution at a concentration level of 2% by weight, and an orifice size of 0.8 mm in diameter, and a height of 5 mm. If the orifices are located in the coagulation solution, the flowing rate of the slurry suitable for manufacturing the rod-shaped proppant can be, for example, from 0.01 m/s to 5 m/s for an orifice of 0.37 mm in diameter and a slurry composition as in the example discussed immediately above.

As discussed above, the shaped slurry exiting the orifices is in a form of a continuous uninterrupted stream, and is flowed such that it either exits the orifices directly into the coagulation solution in which the orifices are immersed, or is made to penetrate into the coagulation solution when the orifices are located above the coagulation solution, thereby coagulating the reactant in order to form stabilized rods. The stabilized rods from each orifice have a continuous length.

The stabilized rods are collected from the coagulation solution by any suitable methodology. The collected stabilized rods are then dried using any suitable drying processes. For example, the stabilized rods may be subjected to air drying, or to drying using electric or gas driers.

After drying, the rods may be compressed or cut into desired length proper for application as proppant and/or anti-flowback additives. The cutting can be performed with any suitable length reducing mechanism, for example, a rotating blade, a cross cutter, a cutting mill and the like. The reduction of length can be performed before or after the rods are sintered. Sintering may be conducted at a temperature of from, for example, about 800° C. to about 2,300° C., such as from about 1,200° C. to about 1,700° C.

Figure 2:
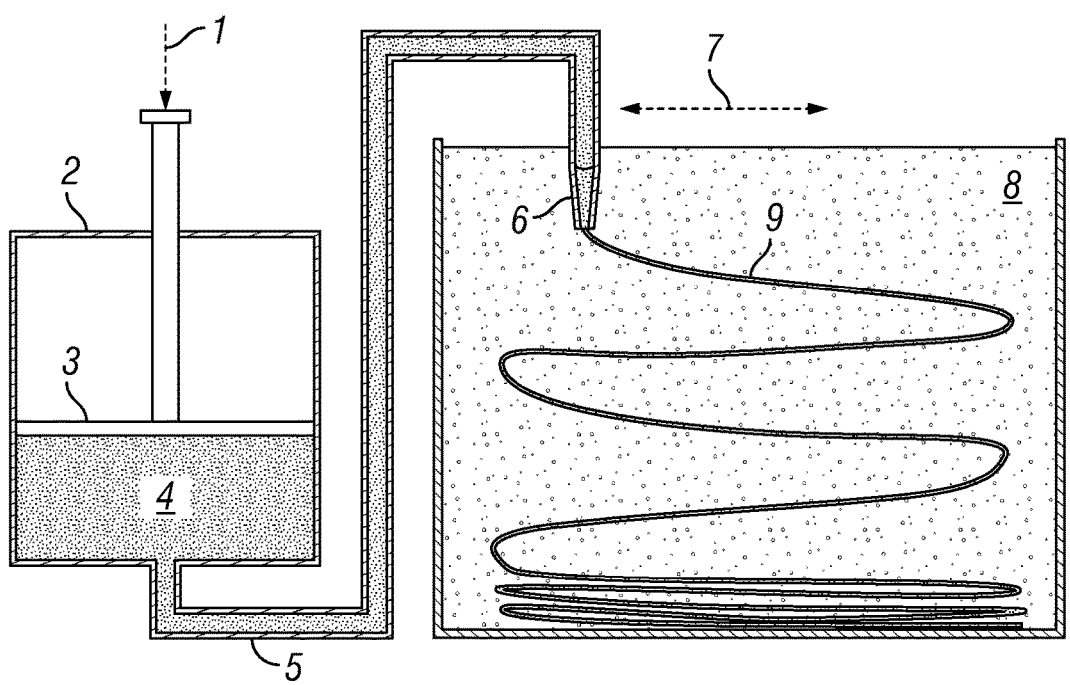
FIG. 2 is a schematic of an example apparatus for carrying out a method for making rod-shaped particles as described herein.

FIG. 2 is a schematic of one apparatus that may be used for carrying out the above-described method. In FIG. 2, the slurry (4) housed in container (2) is forced to flow by applying a load (1) on a piston (3). When the load is applied to the slurry, the slurry is made to flow out an exit port at the bottom of the container and into tube or pipe (5) that is connected with a nozzle (orifice) (6). In this case, the nozzle is immersed in the coagulation solution (8). The slurry exits the nozzle as a continuous uninterrupted rod (9). Also shown in FIG. 2 is the option for the nozzle to move side to side in a horizontal direction with respect to the surface of the coagulation solution, thereby stacking the continuous rod (9) in an organized manner within the coagulation solution.

In the embodiments described above, the slurry was made to have a continuous uninterrupted flow, with the end rod-shaped particles being subsequently cut therefrom. In other embodiments, it is possible to sever the slurry flow as it exits the orifices at the predetermined length desired for the end rod-shaped particles. In this embodiment, a periodic spike vibration is applied to the one or more orifices when an amount of slurry that has passed through the one or more orifices is such that the slurry having exited through the one or more orifices has a predetermined length for the rod-shaped particles. Whereas above a low vibration frequency was possibly applied to thin but not sever the continuous flow, here the periodic spike vibration is sufficient to sever the continuous flow at the orifices. For example, after a predetermined amount of slurry has passed through the orifices to achieve rod-shaped particles of the desired length, which can be readily set based upon the flow speed of the slurry through the orifices, a vibration amplitude may be quickly applied to sever the flow at the orifices. The vibration amplitude and the flowing speed of the slurry together may be used to determine the desired length of the rod-shaped particles.

Application of the vibration may be controlled such that it is applied at regular intervals based on the flow rate of the slurry in order to sever the slurry flow at the desired lengths of the rod-shaped particles.

The processing of the severed rod-shaped portions then proceeds as in the embodiments described above, with the exception that the subsequent cutting step after drying can be omitted.

The rod-shaped particles herein may have an average length of 0.2 mm to 5 cm, an average diameter (or cross-sectional width) of 0.1 mm to 1 cm, and an average length to diameter of at least 2:1. The rod-shaped particles desirably have an average length of 0.2 mm to 5 cm, for example from 0.2 mm to 1 cm or from 0.2 mm to 50 mm. The rod-shaped particles desirably have an average diameter (or cross-sectional width) of 0.1 mm to 1 cm, for example from 0.1 mm to 5 mm or 0.1 mm to 1 mm. The rod-shaped particles have an average length to diameter (or width) of at least 2:1, for example of 5:1 to 1,000:1 or 5:1 to 100:1.

The rod-shaped particles made by the methods herein possess a number of desirable properties compared to conventional spherical proppants and anti-flowback additives.

Where the rod-shaped particles are used as proppant in a treatment fluid, compared to conventional spherically shaped proppant, the rod-shaped particles disclosed herein may interlock with fiber included in the treatment fluid, as well as interlock with themselves, achieving a lower settling rate, and thus can be more easily transported into fractures. Fracturing methodologies that use fibers in the fracturing fluid typically rely on proppant clusters/pillars to maintain the width of a fracture and channels for conducting the formation fluid. Pillars with low strength may spread and collapse under closure stress, which reduces the channel size and/or eliminates the channels. The interlocking of the rod-shaped particles herein with the fibers and with themselves may increase the strength of the pillars, compared to the use of spherical proppant with a similar surface texture.

Besides the strength of the proppant, a tight packing may inhibit the flow of the formation fluid to the wellbore. The way of packing can depend on the shape of the proppant. The rod-shaped particles disclosed herein may interlock with each other, thereby reducing their mobility, which in turn may help to maintain an adequate level of porosity and conductivity for formation fluids such as oil and/or gas to flow.

The rod-shaped particles described herein may thus be harder to flow back compared to spherically shaped proppant. The particles can be used together with other shaped proppants as an anti-flowback additive. The particles can also be used together with fiber to achieve enhanced anti-flowback control.

Packs of the rod-shaped particles in a fracture can have high conductivity due to high porosity resulting from mechanisms of the particles' interlocking.

The mechanical interactions of rod-shaped particles with themselves and/or with fiber may increase the capability of the fiber to transport proppant into the fracture during a fracturing treatment and also may increase the strength of pillars when the fracture walls close onto the pillars.

In some embodiments, the concentration of the rod-shaped particles in the treatment fluid may be any desired value, such as a concentration in the range of from about 0.01 to about 80% by weight of the treatment fluid, or a concentration in the range of from about 0.1 to about 25% by weight of the treatment fluid, or a concentration in the range of from about 1 to about 10% by weight of the treatment fluid.

Although the rod-shaped particles may be used by themselves in the fluid, for example as proppants for a fracture, they may also be used together with conventional proppants, for example with spherical proppant particles of glass, sand, ceramic and the like. Other proppant particles may be used in a weight ratio of the rod-shaped particles to the other proppant particles of from 0.1:1 to 10:1. In some embodiments, other proppants may include sand, synthetic inorganic proppants, coated proppants, uncoated proppants, resin coated proppants, and resin coated sand. The proppants may be natural or synthetic (including silicon dioxide, sand, nut hulls, walnut shells, bauxites, sintered bauxites, glass, natural materials, plastic beads, particulate metals, drill cuttings, ceramic materials, and any combination thereof), coated, or contain chemicals; more than one may be used sequentially or in mixtures of different sizes or different materials. The proppant may be resin coated. The rod-shaped particles may also be resin coated, where desired.

In some embodiments, the treatment fluids may also include a fibrous material, as well known in the art. Fibers may be included in the treatment fluid in order to assist in transport of the rod-shaped particles into the fractures. For example, the treatment fluid may comprise rod-shaped particles and a fiber of any desired thickness (diameter), density and concentration that is effective to assist in the downhole operation. The fiber may be one or more member selected from natural fibers, synthetic organic fibers, glass fibers, ceramic fibers, carbon fibers, inorganic fibers, metal fibers, a coated form of any of the above fibers.

Fibers may be used in bundles. The fibers may have a length in the range of from about 1 mm to about 30 mm, such as in the range of from about 5 mm to about 20 mm. The fibers may have any suitable diameter or cross dimension (shortest dimension), such as a diameter of from about 5 to 500 microns, or a diameter of from about 20 to 100 microns, and/or a denier of from about 0.1 to about 20, or a denier of from about 0.15 to about 6.

The fibers may be formed from a degradable material or a non-degradable material. The fibers may be organic or inorganic. Non-degradable materials are those wherein the fiber remains substantially in its solid form within the well fluids. Examples of such materials include glass, ceramics, basalt, carbon and carbon-based compound, metals and metal alloys. Polymers and plastics that are non-degradable may also be used as non-degradable fibers. Such polymers and plastics that are non-degradable may include high density plastic materials that are acid and oil-resistant and exhibit a crystallinity of greater than 10%. Degradable fibers may include those materials that can be softened, dissolved, reacted or otherwise made to degrade within the well fluids. Such materials may be soluble in aqueous fluids or in hydrocarbon fluids.

Suitable fibers may also include any fibrous material, such as, for example, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof.

The treatment fluid includes a carrier solvent that may be a pure solvent or a mixture. Suitable solvents may be aqueous or organic based. For example, the treatment fluid may include a carrier solvent and the rod-shaped particles. The fluid may be any suitable fluid, such as, for example, water, fresh water, produced water, seawater, or an aqueous solvent, such as brine, mixtures of water and water-soluble organic compounds and mixtures thereof. Other suitable examples of fluids include hydratable gels, such as guars, poly-saccharides, xanthan, hydroxy-ethyl-cellulose; cross-linked hydratable gels, viscosified acid, an emulsified acid (such as with an oil outer phase), an energized fluid (including, for example, an $N_2$ or $CO_2$ based foam), and an oil-based fluid including a gelled, foamed, or otherwise viscosified oil. Suitable organic solvents that may act as a carrier solvent for the treatment fluids of the disclosure include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxyethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N, N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

Treatment fluids may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers. Furthermore, the treatment fluid may comprise buffers, pH control agents, and various other additives added to promote the stability or the functionality of the treatment fluid. The components of the treatment fluid may be selected such that they may or may not react with the subterranean formation that is to be treated.

In some embodiments, the treatment fluid may further have a viscosifying agent. The viscosifying agent may be any crosslinked polymers. The polymer viscosifier can be a metal-crosslinked polymer. Suitable polymers for making the metal-crosslinked polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other suitable classes of polymers that may be used as a viscosifying agent include polyvinyl polymers, polymethacrylamides, cellulose ethers, lignosulfonates, and ammonium, alkali metal, and alkaline earth salts thereof. Additional examples of other water soluble polymers that may be used as a viscosifying agent include acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyalkyleneoxides, other galactomannans, heteropolysaccharides obtained by the fermentation of starch-derived sugar and ammonium and alkali metal salts thereof.

In some embodiments, the carrier fluid may optionally further comprise additional additives, including, for example, acids, fluid loss control additives, gas, corrosion inhibitors, scale inhibitors, catalysts, clay control agents, biocides, friction reducers, combinations thereof and the like. For example, in some embodiments, it may be desired to foam the composition using a gas, such as air, nitrogen, or carbon dioxide.

The foregoing is further illustrated by reference to the following examples, which are presented for purposes of illustration and are not intended to limit the scope of the present disclosure.

EXAMPLES

To prepare rod-shaped particles, the apparatus of FIG. 2 was used, with the orifices immersed in the coagulation solution. a sample slurry of 144 g water, 400 g ceramic raw powder (alumina-based), 1.6 g of sodium alginate, 0.8 g of dispersant (synthetic polyelectrolyte dispersing agent), 0.38 g of phosphate based surfactant and 0.48 g of lubricant (alkali-free pressing agent) was prepared and used for illustration. The coagulation solution was a 2 w % of calcium chloride solution. The injecting speed of the slurry into the coagulation solution was 1 m/s. After being dried at room temperature conditions, the rod was broken into shorter lengths. In one example, the orifice diameter was set to 0.37 mm, and resulted in rod-shaped particles having an end diameter of 0.45 mm. In another example, the orifice diameter was set to 0.80 mm, and resulted in rod-shaped particles having an end diameter of 0.81 mm.

Although the preceding description has been set forth with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method for forming rod-shaped particles, the method comprising:
   inducing flow of a slurry comprised of particles and a reactant through one or more orifices and into a coagulation solution, wherein the slurry exiting the one or more orifices is a continuous uninterrupted stream, and wherein the one or more orifices is capable of moving vertically, laterally, or into and out of a surface of the coagulation solution during flowing of the slurry;
   coagulating the reactant in the coagulation solution to form stabilized rods;

drying the stabilized rods; and reducing a length of the dried stabilized rods.

2. The method according to claim 1, wherein the inducing flow of the slurry is performed by applying a load to a piston in a container housing the slurry to force the slurry through the one or more orifices associated with an exit of the container, increasing pressure in the container housing the slurry to force the slurry through the one or more orifices associated with an exit of the container, decreasing a volume of the container housing the slurry to force the slurry through the one or more orifices associated with an exit of the container, or pumping the slurry from the container housing the slurry to force the slurry through the one or more orifices associated with an exit of the container.

3. The method according to claim 1, wherein the method further comprises forming the slurry prior to inducing flow of the slurry by mixing the reactant and the particles.

4. The method according to claim 1, wherein the particles are ceramic particles.

5. The method according to claim 4, wherein the ceramic particles are alumina-containing particles.

6. The method according to claim 1, wherein the reactant is an alginate and the coagulation solution comprises a calcium salt.

7. The method according to claim 1, wherein the one or more orifices are located above the coagulation solution and the slurry exiting the one or more orifices remains in a continuous uninterrupted stream during falling to the coagulation solution.

8. The method according to claim 1, wherein the one or more orifices are located in the coagulation solution.

9. The method according to claim 1, wherein the one or more orifices have a geometrical shape and impart a corresponding geometrical cross-section to the rod-shaped particles.

10. The method according to claim 9, wherein the imparted geometrical cross-section is selected from the group consisting of circular, elliptical, oval, quatrefoil, triangular and rectangular.

11. The method according to claim 1, wherein the method further comprises applying an intermittent vibration to the one or more orifices to thereby vary a cross-sectional diameter of the continuous uninterrupted stream exiting the one or more orifices.

12. The method according to claim 1, wherein the one or more orifices comprise one or more nozzles or one or more openings of a membrane.

13. The method according to claim 1, wherein the method further comprises sintering the dried stabilized rods or the rod-shaped particles.

14. The method according to claim 1, wherein the reducing the length of the dried stabilized rods comprises cutting the dried stabilized rods.

15. The method according to claim 1, wherein the rod-shaped particles have an average length of 0.1 mm to 5 cm, an average diameter of 0.2 mm to 1 cm and an average length to diameter of at least 2:1.

16. A method for forming rod-shaped particles, the method comprising:

inducing flow of a slurry comprised of particles and a reactant through one or more orifices and into a coagulation solution, wherein the one or more orifices is capable of moving vertically, laterally, or into and out of the coagulation solution;

applying a vibration to the one or more orifices when an amount of slurry that has passed through the one or more orifices is such that the slurry having exited through the one or more orifices has a predetermined length for the rod-shaped particles, wherein the vibration is sufficient to separate the exited slurry from the slurry flow at the one or more orifices;

coagulating the reactant in the coagulation solution to form stabilized rods; and drying the stabilized rods to form the rod-shaped particles.

17. The method according to claim 16, wherein the particles are ceramic particles.

* * * * *